Figure 1:
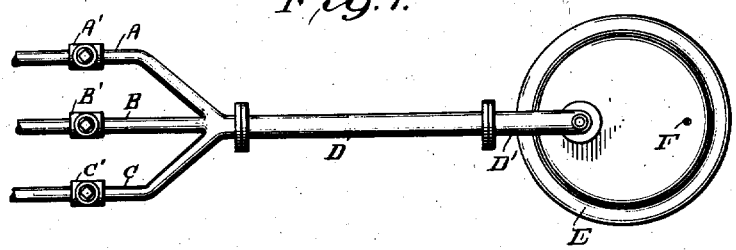

UNITED STATES PATENT OFFICE.

JULIUS BUEB, OF DESSAU, GERMANY.

MANUFACTURE OF AMMONIUM CARBONATE.

1,018,406. Specification of Letters Patent. Patented Feb. 27, 1912.

Application filed April 12, 1910. Serial No. 555,034.

*To all whom it may concern:*

Be it known that I, JULIUS BUEB, a subject of the German Emperor, and resident of Dessau, Germany, have invented certain new and useful Improvements in the Manufacture of Ammonium Carbonate, of which the following is a specification.

The manufacture of ammonium carbonate is, at the present time, carried out by first precipitating in the wet way the difficultly soluble ammonium bicarbonate obtained by introducing carbon dioxid into an aqueous solution of ammonium carbonate. After preliminary drying, this ammonium bicarbonate is heated in sublimation pans and collected, as sublimed ammonium carbonate, in superposed inverted vessels. This process involves large and costly installation which has the further disadvantage that its use always entails a somewhat large loss of ammonia, usually about thirty per cent. It has also been attempted to manufacture ammonium carbonate by allowing carbon dioxid and ammonia gas to unite in the presence of steam. These attempts have not proved successful in practice, because the combination of carbon dioxid and ammonia gas to form solid ammonium carbonate took place very slowly, so that enormously large spaces and much time were required to obtain a solid marketable product.

The process in accordance with the present invention enables large quantities of marketable ammonium carbonate to be obtained in comparatively small spaces. The process consists in causing gaseous ammonia, carbon dioxid and steam to act upon each other at a temperature above the temperature of decomposition of the ammonium carbonate, the quantity of steam relative to the ammonia and carbon dioxid employed being in accordance with the amount of ammonia which the required salt is to contain.

The process is preferably carried out as follows: The gaseous ammonia, carbon-dioxid and steam are passed together in about the proportions in which they exist in sublimed ammonium carbonate through a comparatively narrow iron tube, which is highly heated from the outside, so that the gases, after they have passed through the tube, have a temperature which is above the temperature of decomposition of ammonium carbonate. The hot gases heated in this manner are led into a sublimating chamber which is cooled from the outside, and has suspended therein hollow plates, or the like, which are cooled internally for the purpose of further increasing the cooling effect. The process takes place in such a manner that the gases on being heated so act upon each other that upon cooling they rapidly combine to form ammonium carbonate, which, however, is not yet deposited as the decomposing temperature of ammonium carbonate lies, as is well known, above 60° centigrade. The precipitation and formation of solid ammonium carbonate takes place, however, immediately the gases enter the sublimation chamber and become cooled to below 60° centigrade, the ammonium carbonate then depositing in thick crusts on the walls and suspended cooling surfaces.

Figure 2:
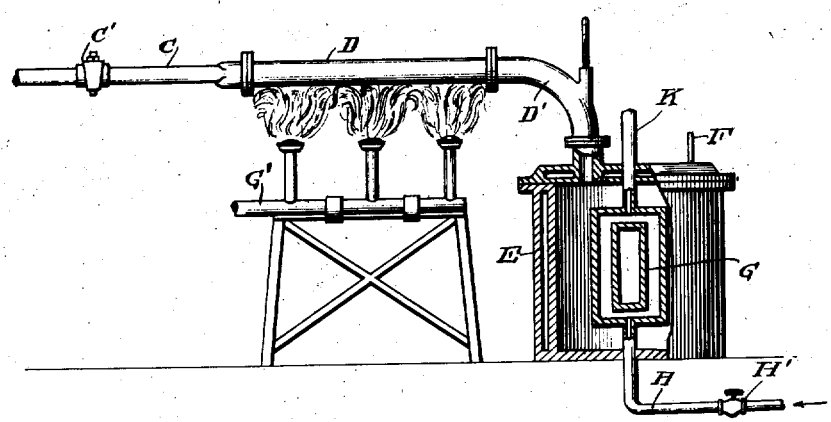

In the accompanying drawing, Figure 1 is a plan view of one form of apparatus that may be employed to carry out the process herein described; Fig. 2 is an elevation, and partial section, of such apparatus.

Referring to the drawing A, B, and C, respectively designate pipes for supplying steam, carbon dioxid and gaseous ammonia to a mixing tube D, each of said supply pipes being provided with a suitable valve $A'$, $B'$, $C'$. Suitable means, such as the burners $G'$, are provided for heating the tube D and the latter communicates through an extension $D'$, with a water jacketed subliming chamber E.

In carrying out the process with the form of apparatus illustrated, the valves or cocks $A'$, $B'$, $C'$, are so adjusted that the gaseous ammonia, carbon dioxid and steam are supplied to the mixing tube D in about the proportions required to produce ammonium carbonate containing the desired percentage of ammonia, a slight excess of carbon dioxid being preferably maintained. As before noted the mixing tube D must be heated to such an extent that the mixed gases, after passing therethrough will have a temperature above the temperature at which ammonium carbonate is decomposed. The hot gases pass through the pipe $D'$ into the chamber E which is cooled by the surrounding water jacket and may have suspended therein suitably cooled plates whereby the temperature of the gases is lowered to below 60° C. and the ammonium carbonate is deposited as described. Any uncombined carbon dioxid is permitted to escape from the chamber E through a vent tube F.

The plates G, G may be advantageously maintained at a temperature below 60° C. by means of a suitable refrigerating agent as water, admitted to the said plates through pipe H, supplied with a suitable valve H', the refrigerating agent escaping through pipe K.

Instead of heating the gaseous ammonia, carbon dioxid and steam together, each can be heated separately, the gases reacting on one another when they meet in their heated state.

In the hereinbefore described process it has been found that the quantity of steam used is inversely proportional to the ammonia contents of the salt obtained. It is accordingly possible to vary the ammonia contents of the ammonium carbonate to be prepared by a corresponding regulation of the steam supply. The amount of carbon dioxid in the salt remains practically constant in this case, about 50 per cent., whereas the amount of ammonia ranges between about 20 and 40 per cent. If, for instance, ammonia and carbon dioxid be subjected to the action of but very little steam, a very highly valuable salt is obtained which contains above 40 per cent. of ammonia. By increasing the amount of steam relatively to the amount of ammonia, it is possible to produce salts containing a proportionately less and less percentage of ammonia, so that a contents in ammonia of nearly as little as 20 per cent. can be obtained.

The following chemical equations will serve to illustrate more clearly the foregoing statement, but it must be understood that pure ammonium carbonate is not found in commerce, and wherever the term "ammonium carbonate" is employed in this application it is in the commercial, or trade, sense, and embraces all compounds of ammonia, carbon dioxid and water, or mixtures of such compounds.

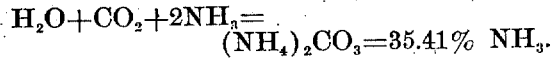
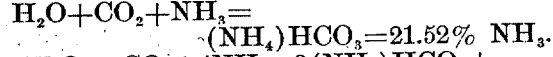
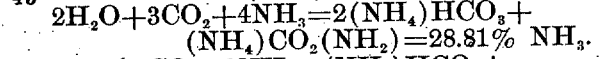
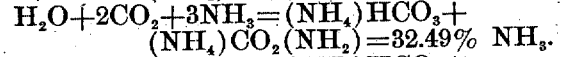
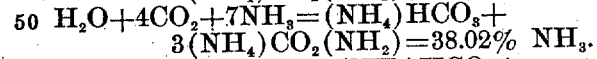
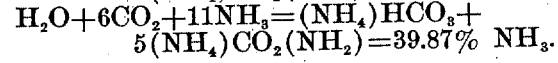

Special advantages of an economic nature are secured in the present process by isolating separately from the ammoniacal liquors of gas works, large amounts of ammonia, and the carbon-dioxid contained therein, both bodies being thereupon caused to form ammonium carbonate by treatment at a high temperature in the presence of steam at a high temperature in accordance with the process of the invention.

I claim:

1. The herein described method of making ammonium carbonate, consisting in subjecting a mixture of gaseous ammonia, carbon dioxid, and steam to a temperature above the temperature of decomposition of ammonium carbonate, and cooling the hot mixture.

2. The herein described method of making ammonium carbonate, consisting in subjecting a mixture of gaseous ammonia, carbon dioxid and steam to a temperature above the temperature of decomposition of ammonium carbonate, regulating the quantity of steam supplied according to the percentage of ammonia desired in the salt produced, and cooling the hot mixture.

3. The herein described method of making ammonium carbonate, consisting in passing gaseous ammonia, carbon dioxid and steam through a vessel externally heated to a temperature above the temperature of decomposition of ammonium carbonate, and cooling the hot mixture.

4. The herein described method of making ammonium carbonate consisting in passing gaseous ammonia, carbon dioxid and steam through a vessel externally heated to a temperature above the temperature of decomposition of ammonium carbonate, regulating the quantity of steam supplied according to the percentage of ammonia desired in the salt produced, and cooling the hot mixture.

In testimony whereof I have signed my name to this specification in the presence of two subscribing witnesses.

JULIUS BUEB.

Witnesses:
WOLDEMAR HAUPT,
HENRY HASPER.